(12) United States Patent
Wilson et al.

(10) Patent No.: US 10,434,828 B2
(45) Date of Patent: Oct. 8, 2019

(54) ATTACHMENT PATCH FOR MOUNTING DEVICES

(71) Applicant: Bridgestone Americas Tire Operations, LLC, Nashville, TN (US)

(72) Inventors: Paul B. Wilson, Tallmadge, OH (US); John D. Rensel, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 267 days.

(21) Appl. No.: 15/525,969

(22) PCT Filed: Oct. 9, 2015

(86) PCT No.: PCT/US2015/054800
§ 371 (c)(1),
(2) Date: May 11, 2017

(87) PCT Pub. No.: WO2016/099633
PCT Pub. Date: Jun. 23, 2016

(65) Prior Publication Data
US 2017/0349010 A1 Dec. 7, 2017

Related U.S. Application Data

(60) Provisional application No. 62/094,100, filed on Dec. 19, 2014.

(51) Int. Cl.
*B60C 23/04* (2006.01)
*B29D 30/00* (2006.01)

(52) U.S. Cl.
CPC .. *B60C 23/0493* (2013.01); *B29D 2030/0072* (2013.01)

(58) Field of Classification Search
None
See application file for complete search history.

(56) References Cited

U.S. PATENT DOCUMENTS

| 5,090,237 A | 2/1992 | Schrumpf et al. |
| 5,500,065 A | 3/1996 | Koch et al. |
(Continued)

FOREIGN PATENT DOCUMENTS

| JP | 2008-230411 | 10/2008 |
| JP | 2011-02557 | 3/2011 |
(Continued)

OTHER PUBLICATIONS

Winter, Drew, "'Intelligent' Tires to Debut by 2013," WardsAuto.com, posted Jun. 25, 2010 9:00 A.M., Penton Media Inc.
(Continued)

*Primary Examiner* — Paul M. West
*Assistant Examiner* — Mark A Shabman

(57) ABSTRACT

An apparatus for mounting an object within a tire includes a ply having a first side for mounting against an innerliner of the tire and a pedestal extending upwards from a second side of the ply. The pedestal has a recessed planar top surface, with an elongated front cavity, an elongated rear cavity, and a substantially cylindrical central cavity disposed therein. The substantially cylindrical cavity is defined by an internal sidewall. The internal sidewall includes mating structure selected from the group consisting of threads and a plurality of downwardly extending slots.

20 Claims, 16 Drawing Sheets

(56) References Cited

U.S. PATENT DOCUMENTS

| | | | |
|---|---|---|---|
| 5,562,787 A | 10/1996 | Koch et al. | |
| 5,573,610 A | 11/1996 | Koch et al. | |
| 5,573,611 A | 11/1996 | Koch et al. | |
| 5,731,754 A | 3/1998 | Lee, Jr. et al. | |
| 5,877,679 A | 3/1999 | Prottey | |
| 5,960,844 A | 10/1999 | Hamaya | |
| 5,971,046 A | 10/1999 | Koch et al. | |
| 6,030,478 A * | 2/2000 | Koch | B60C 23/04 156/123 |
| 6,105,423 A | 8/2000 | Prottey | |
| 6,192,746 B1 | 2/2001 | Wilson | |
| 6,255,940 B1 | 7/2001 | Phelan et al. | |
| 6,309,494 B1 | 10/2001 | Koch et al. | |
| 6,371,178 B1 | 4/2002 | Wilson | |
| 6,443,198 B1 | 9/2002 | Koch et al. | |
| 6,444,069 B1 | 9/2002 | Koch et al. | |
| 6,462,650 B1 | 10/2002 | Balzer et al. | |
| 6,474,380 B1 | 11/2002 | Rensel et al. | |
| 6,546,982 B1 | 4/2003 | Brown et al. | |
| 6,581,657 B1 | 6/2003 | Brown | |
| 6,624,748 B1 | 9/2003 | Phelan et al. | |
| 6,653,936 B2 | 11/2003 | Bohm et al. | |
| 6,668,884 B2 | 12/2003 | Koch et al. | |
| 6,724,301 B2 | 4/2004 | Ginman et al. | |
| 6,788,192 B2 | 9/2004 | Shimura | |
| 6,854,324 B2 | 2/2005 | Landes et al. | |
| 6,860,303 B2 | 3/2005 | Rensel et al. | |
| 6,868,717 B2 | 3/2005 | Koch et al. | |
| 6,885,291 B1 | 4/2005 | Pollack et al. | |
| 6,946,048 B2 | 9/2005 | Koch | |
| 7,009,506 B2 | 3/2006 | Wilson et al. | |
| 7,028,732 B1 | 4/2006 | Phelan et al. | |
| 7,050,017 B2 | 5/2006 | King et al. | |
| 7,082,818 B2 | 8/2006 | Wilson | |
| 7,108,761 B2 | 9/2006 | Bell | |
| 7,132,930 B2 | 11/2006 | Wilson et al. | |
| 7,186,308 B2 | 3/2007 | Metcalf et al. | |
| 7,243,534 B2 | 7/2007 | Ogawa | |
| 7,275,427 B1 | 10/2007 | Martin | |
| 7,292,138 B2 | 11/2007 | Jang | |
| 7,295,103 B2 | 11/2007 | Muller et al. | |
| 7,310,997 B2 | 12/2007 | Tozawa et al. | |
| 7,325,448 B2 | 2/2008 | Ichikawa et al. | |
| 7,329,325 B2 | 2/2008 | Prost | |
| 7,347,088 B2 | 3/2008 | Shimura | |
| 7,353,720 B2 | 4/2008 | Sinnett | |
| 7,391,307 B2 | 6/2008 | Kuwajima | |
| 7,430,906 B2 | 10/2008 | Nakao et al. | |
| 7,444,858 B2 | 11/2008 | Bickel | |
| 7,504,947 B2 | 3/2009 | Tucker | |
| 7,510,618 B2 | 3/2009 | Koch | |
| 7,543,490 B2 | 6/2009 | Rey et al. | |
| 7,549,327 B2 | 6/2009 | Breed | |
| 7,592,902 B2 | 9/2009 | Wilson et al. | |
| 7,598,877 B2 | 10/2009 | Lionetti | |
| 7,661,300 B2 | 2/2010 | Sinnett et al. | |
| 7,690,578 B2 | 4/2010 | Kawai | |
| 7,770,444 B2 | 8/2010 | Bertrand | |
| 8,596,117 B2 | 12/2013 | Wilson et al. | |
| 2002/0066506 A1 | 6/2002 | Wilson | |
| 2002/0174925 A1 | 11/2002 | Wilson et al. | |
| 2004/0094251 A1 | 5/2004 | Strache et al. | |
| 2004/0182494 A1 | 9/2004 | Dominak et al. | |
| 2005/0000278 A1 | 1/2005 | Haralampu et al. | |
| 2005/0076982 A1 | 4/2005 | Metcalf et al. | |
| 2005/0126668 A1 | 6/2005 | Fornerod et al. | |
| 2006/0059982 A1 | 3/2006 | Shimura | |
| 2006/0158340 A1 | 7/2006 | Wilson et al. | |
| 2007/0175554 A1 | 8/2007 | Bertrand | |
| 2007/0274030 A1 | 11/2007 | Robert | |
| 2008/0053582 A1 | 3/2008 | Shimura | |
| 2008/0083482 A1 | 4/2008 | Logan | |
| 2008/0251172 A1 | 10/2008 | Robert et al. | |
| 2009/0151828 A1 | 6/2009 | Zhao et al. | |
| 2009/0151829 A1 | 6/2009 | Lionetti et al. | |
| 2009/0167518 A1 | 7/2009 | Koch | |
| 2010/0024538 A1 | 2/2010 | Hammerschmidt | |
| 2010/0032066 A1 | 2/2010 | Nakao et al. | |
| 2010/0043541 A1 | 2/2010 | Kobayakawa | |
| 2010/0108211 A1 | 5/2010 | Fenkanyn | |
| 2010/0122757 A1 | 5/2010 | Lionetti et al. | |
| 2010/0126263 A1 | 5/2010 | Brusarosco et al. | |
| 2010/0199756 A1 | 8/2010 | Hanatsuka | |
| 2010/0212791 A1 | 8/2010 | Invavo et al. | |
| 2010/0276048 A1 | 11/2010 | Adamson et al. | |
| 2011/0025487 A1 * | 2/2011 | Laird | B60C 23/0493 340/447 |
| 2011/0162767 A1 | 7/2011 | Kleckner | |
| 2013/0081457 A1 * | 4/2013 | Wilson | G01M 17/02 73/146 |

FOREIGN PATENT DOCUMENTS

| | | |
|---|---|---|
| JP | 2014532006 | 12/2014 |
| WO | 2004068769 | 8/2004 |
| WO | 2007048621 | 5/2007 |
| WO | 2007121768 A1 | 11/2007 |
| WO | 2010079215 A1 | 7/2010 |

OTHER PUBLICATIONS

Joong Sub Han; International Search Report and Written Opinion; dated Feb. 25, 2013; Korean Intellectual Property Office; Daejeon, Republic of Korea.

Bae Buen Tae; International Search Report and Written Opinion; dated Jan. 27, 2016; Korean Intellectual Property Office; Daejeon, Republic of Korea.

Supplementary European Search Report, dated Sep. 13, 2018, European Patent Office, European Patent Application No. 15870517.8.

English Machine Translation of WO2010079215A1.

\* cited by examiner

US 10,434,828 B2

ATTACHMENT PATCH FOR MOUNTING DEVICES

FIELD OF INVENTION

The present disclosure relates to the field of attaching a device to a tire. More particularly, the present disclosure relates to an apparatus attached to a tire for receiving devices with different attachment means.

BACKGROUND

Mounting devices are used to attach objects to a tire, and particularly to an innerliner of a tire. One application is to attach a radio frequency identification tag or chip (RFID) to the innerliner of a tire. Another application is to secure a pressure and/or temperature-sensing device to the innerliner of the tire. Various fasteners are used to connect the object to the mounting device, including hook and loop fasteners, threaded connectors, clamps, pins, and snap-fit structures.

SUMMARY OF THE INVENTION

In one embodiment, an assembly for mounting an object inside of a tire includes a rubber ply having a first side affixable to an interior surface of a tire and a pedestal extending from a second side of the rubber ply. The pedestal had a top surface and at least one sidewall. The pedestal has a front cavity in the top surface proximate to a front end of the pedestal, a rear cavity in the top surface proximate to a rear end of the pedestal, and a central cavity in the top surface between the front cavity and the rear cavity. The assembly also includes an electronic device and an intermediate member connected to the electronic device and to the pedestal.

In another embodiment, an apparatus for mounting an object within a tire includes a ply having a first side for mounting against an innerliner of the tire and a pedestal extending upwards from a second side of the ply. The pedestal has a recessed planar top surface, with an elongated front cavity, an elongated rear cavity, and a substantially cylindrical central cavity disposed therein. The substantially cylindrical cavity is defined by an internal sidewall. The internal sidewall includes mating structure selected from the group consisting of threads and a plurality of downwardly extending slots.

In yet another embodiment, a tire monitoring kit includes a mounting apparatus having a plurality of mounting configurations, an electronic device, and means for connecting the electronic device to the mounting apparatus using less than all of the plurality of mounting configurations.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

An "innerliner," as used herein, refers to an impervious surface that is the innermost interior surface of the tire cavity. Both singular and plural forms of this term may be within the definitions.

Figure 1:
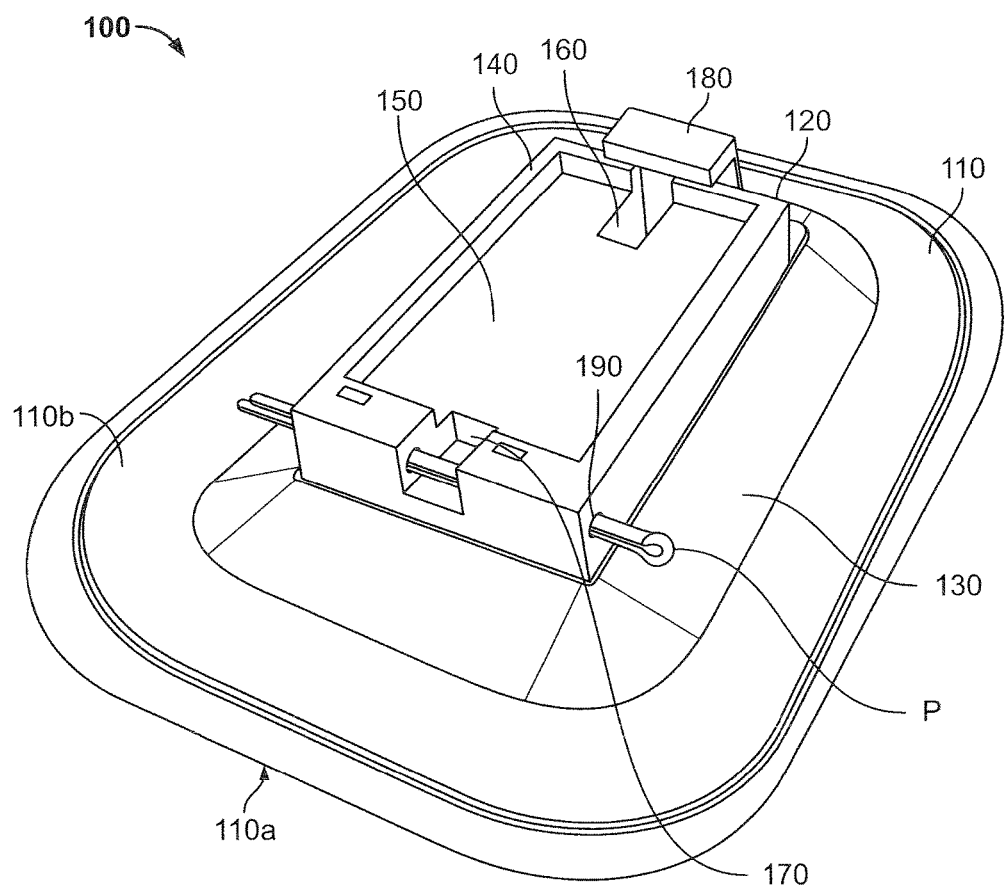
FIG. 1 is a perspective view of one embodiment of a mounting apparatus 100.

FIG. 1 illustrates a perspective view of one embodiment of a mounting apparatus 100. The mounting apparatus includes a ply 110 having a first side 110a and a second side 110b. The first side 110a of the ply is affixable to an innerliner of a tire (not shown). The ply 110 is constructed of a resilient material, such as rubber or other elastomeric material. In one embodiment, the ply 110 is constructed of the same rubber composition as the innerliner of the tire. It should be understood that the ply 110 may be constructed of any thermoplastic or thermoset, including without limitation, neoprene, butyl, TPU, EPDM. A mounting apparatus for tires used in severe use environments, such as high temperatures, high speeds, or high strains, may require a different rubber composition than a mounting apparatus for tires used in milder environments or cold weather environments.

In one embodiment, the ply 110 is affixed to the innerliner of the tire on a sidewall portion of a tire. In another embodiment, the ply 110 is affixed to the innerliner of the tire under the belt area of the tire. In yet another embodiment, the ply 110 is affixed to the innerliner of the tire in a shoulder region of the tire. In still another embodiment, the ply 110 is affixed to the innerliner of the tire in the bead region of the tire.

The affixation position may be selected based on properties of a specific tire type. For example, a tire may be tested to determine stresses, strains, vibrations, temperatures, and other characteristics at various locations during operation of the tire. A location with minimal stresses and strains may be a desirable affixation position, because such a location will minimize the stresses put on the mounting apparatus. Alternatively, a location with maximum stresses and strains may be a desirable affixation position, because an operator may wish to monitor a tire at a location where it is most likely to fail if operating conditions are too severe. Other desirable affixation positions will be apparent to those skilled in the art and include those positions at which an electronic device may transmit a signal to a receiver, without damage to the tire, the electronic device, or the mounting apparatus. The affixation location in the belt area may be a desirable location if the belt does not interfere with transmission.

In one embodiment, the ply 110 is affixed to the innerliner of a green tire at a desired location, and that portion of the mounting apparatus 100 is cured with the tire. The material of the ply 110 will bond with the rubber of the innerliner during curing. Additionally, or in the alternative, an adhesive may be used to mount the innerliner to the green tire, prior to curing.

In an alternative embodiment, the ply 110 is affixed to the innerliner of a cured tire. In one such embodiment, an uncured ply 110 is affixed to the innerliner of a cured tire using a dual cure cement or dual cure gum. Alternatively, other cements, gums, or adhesives may be used to bond the ply 110 to the innerliner. In another alternative embodiment (not shown), the mounting apparatus may be separable into a lower component and an upper component, wherein the lower component of the mounting apparatus is cured with the tire innerliner, and the upper component of the mounting apparatus is affixed to the lower component after the tire has been cured.

A pedestal 120 is connected to the ply 110. In the illustrated embodiment, an angled base 130 extends upwards from the first side 110a of the ply, and the pedestal 120 extends upwards from the angled base 130. The pedestal 120 and base 130 may also be described or characterized as a single pedestal with a plurality of sidewalls. In an alternative embodiment (not shown), the angled base may be omitted. In another alternative embodiment (not shown), the mounting apparatus 100 does not include a ply. In such an embodiment, the pedestal 120 would be mounted directly to the inner liner of the tire.

The pedestal 120 is a rectangular cuboid having a rim 140 that defines a recessed top planar surface 150. However, it should be understood that the pedestal may have any geometric shape. For example, the rim may be omitted or one or more of the edges of the pedestal may be beveled or otherwise curved. As another example, the top surface of the pedestal may be curved concavely or convexly. In an alternative embodiment (not shown), the pedestal includes one or more grooves in its side walls.

With continued reference to FIG. 1, the top surface 150 of the pedestal 120 has a front cavity 160 and a rear cavity 170 disposed therein. A portion of the front cavity 160 is covered by a guard 180. In the illustrated embodiment, each of the front and rear cavities 160, 170 is elongated and substantially centered in the lateral direction. However, the geometry and location of each cavity may be varied. In alternative embodiments, any number of cavities may be employed. For example, two or more cavities may be employed at each end of the pedestal. As another example, the pedestal may have two front cavities and a single rear cavity, or a single front cavity and two rear cavities.

The rear sides of the pedestal 120 include a through hole 190 that extends through the entire rear end of the pedestal. The through hole 190 is sized to receive a pin P. The through hole 190 is positioned such that it crosses the rear cavity 170. That is, when the pin P is received in the through hole 190, a portion of the pin P is visible in the rear cavity 170, in the manner shown in FIG. 1.

Figure 2:
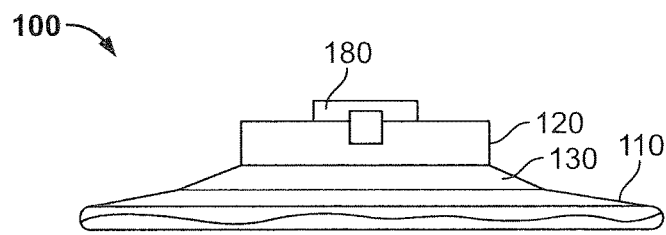
FIG. 2 is a rear view of the mounting apparatus 100.
Figure 3:
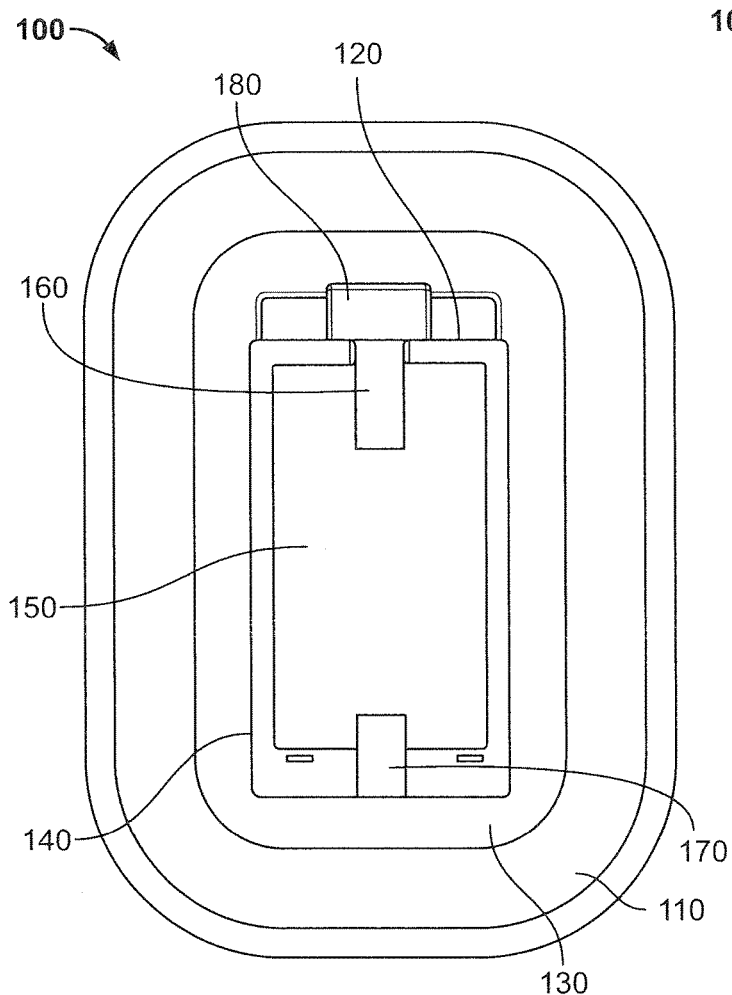
FIG. 3 is a top view of the mounting apparatus 100.
Figure 4:
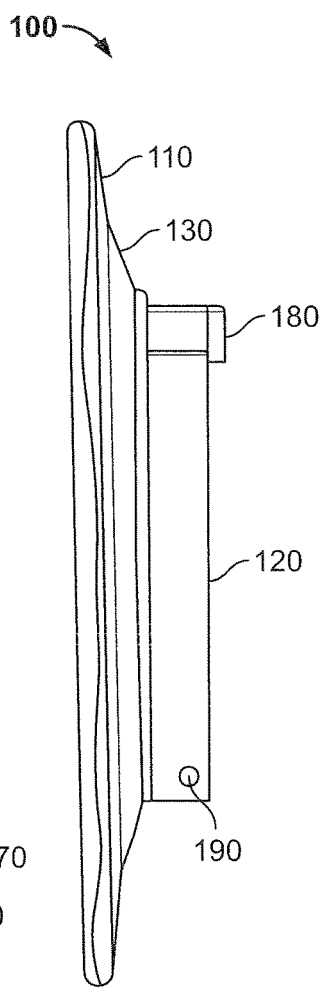
FIG. 4 is a side view of the mounting apparatus 100.

FIGS. 2, 3, and 4 illustrate rear, top, and side views, respectively, of the mounting apparatus 100. As can be seen in these views the pedestal 120 is substantially rectangular when viewed from the top. As shown in the top view of FIG. 3, the base 130 has rounded corners. However, it should be understood that other geometric shapes may be employed. For example, without limitation, one or more of the pedestal and the base may be circular, ovular, square, or hexagonal.

Figure 5:
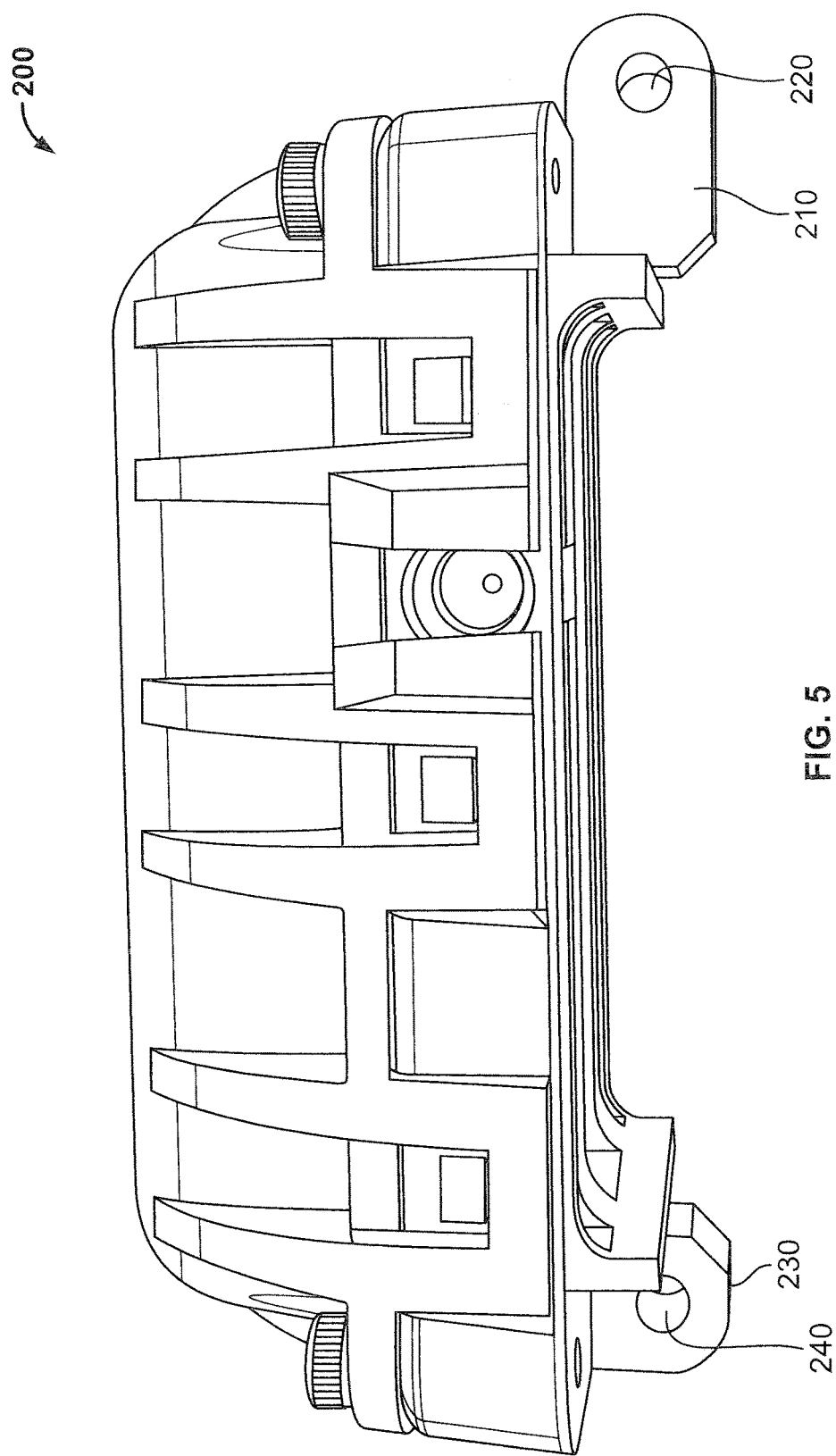
FIG. 5 is a side view of an electronic device 200.

FIG. 5 illustrates a side view of an electronic device 200. The electronic device 200 is provided in a casing, and includes various sensors and communication components. In one embodiment, the electronic device 200 includes a sensor for measuring an internal temperature of a tire and a transmitter device, such as a radio frequency transmitter. In an alternative embodiment, the electronic device includes a sensor for measuring an internal pressure of a tire and a transmitter device. In another alternative embodiment, the electronic device includes one or more sensors for measuring both an internal temperature and an internal pressure of a tire, as well as a transmitter device. In other alternative embodiments, the electronic device may include accelerometers, stress gauges, strain gauges, sensors for counting tire revolutions, temperature sensors for measuring a temperature of tire materials, sensors for measuring tread depths, or any other known sensors. The electronic device may also include identification information.

An external communication device (not shown) may be employed to receive data transmitted from the electronic device 200. The external communication device may be mounted on the vehicle, or it may be part of a handheld or stationary device. In one embodiment, the electronic device 200 may be placed in a "sleep" or non-transmitting state until it receives a signal from the external communication device, or until it otherwise senses that it is in proximity with the external communication device. In such an embodiment, the electronic device would include a receiver and signal processing hardware.

Additionally, the electronic device 200 includes a power source, such as a battery. In an alternative embodiment, the power source may be a current generator that generates current during rotation of the tire. For example, energy may be harvested from vibration, temperature, or other environmental parameter. Alternatively, backscatter technology may be employed to derive energy from an external source. For example, energy may be derived from the external communication device described above.

The electronic device 200 includes a front lobe 210 disposed on a bottom surface of the device. The front lobe is laterally centered on the electronic device 200 and projects forward beyond a front surface of the casing of the electronic device 200. In the illustrated embodiment, the front lobe 210 includes a through hole 220. In an alternative embodiment (not shown), the through hole is omitted.

The electronic device 200 also includes a rear lobe 230 disposed on the bottom surface of the device. The rear lobe 230 is laterally centered on the electronic device 200 and is aligned with a rear surface of the casing of the electronic device 200. The rear lobe 230 includes a through hole 240. The front and rear lobes 210, 230 may be referred to as intermediate members.

In alternative embodiments, the number and the location of the lobes may vary. For example, the electronic device may have multiple front lobes and multiple rear lobes. As another example, the electronic device may have two front lobes and a single rear lobe, or a single front lobe and two rear lobes.

It should be understood that the number of lobes need not correspond to the number of cavities in the pedestal. The number of lobes may be less than the number of cavities in the pedestal. For example, a first electronic device may have lobes in a first set of locations and a second electronic device may have lobes in a second set of locations. The pedestal may have cavities in both a first and second set of locations so that it may accommodate both the first and second electronic devices.

Figure 6:
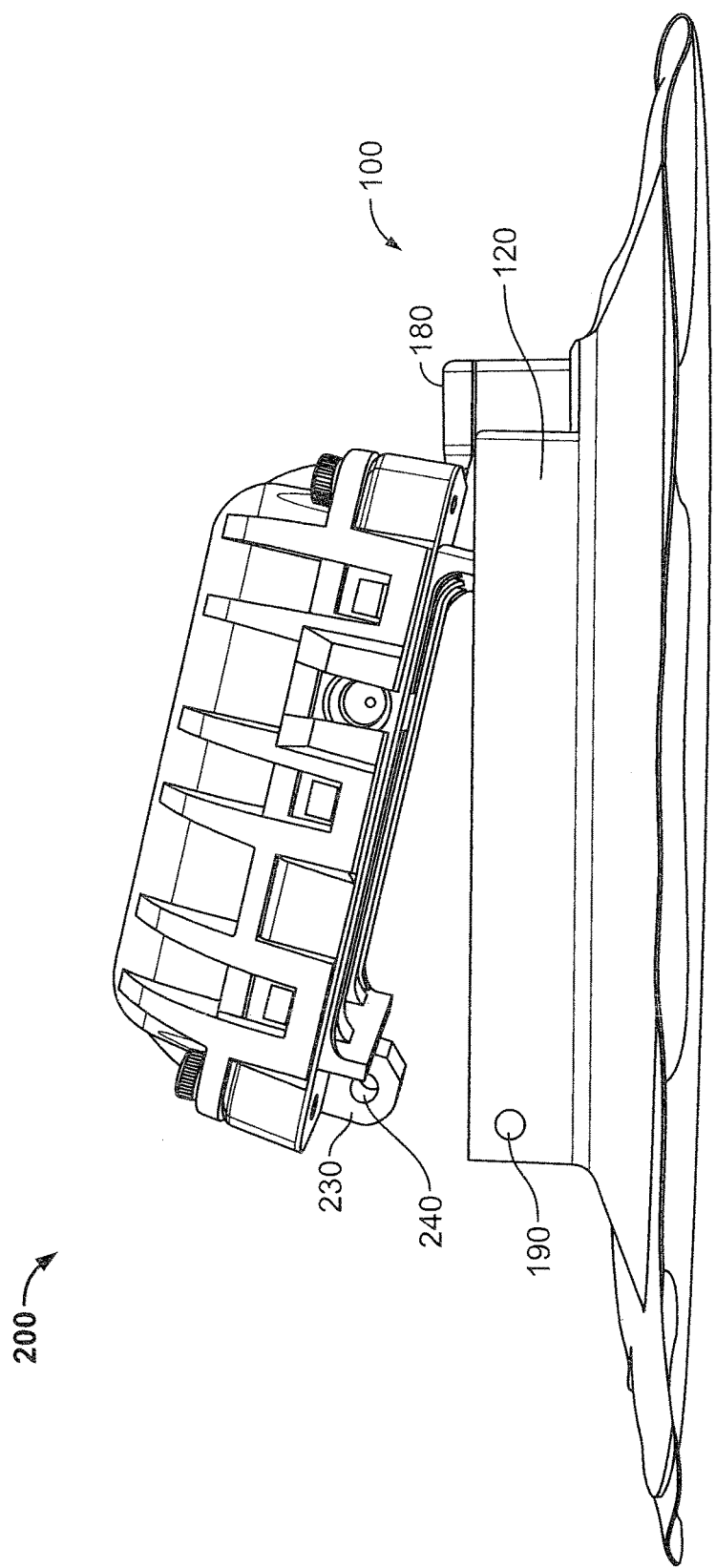
FIG. 6 is a side view of a partially assembled mounting apparatus 100 and electronic device 200.

FIG. 6 illustrates a side view of a partially assembled mounting apparatus 100 and electronic device 200. In this view, the front lobe is hidden from view because it has been inserted into the front cavity of the mounting apparatus 100. The front lobe is disposed under the guard 180. When the front lobe of the electronic device 200 is inserted into the front cavity of the mounting apparatus 100, the guard 180 limits the vertical movement of the front lobe.

In one embodiment, the front cavity 160 of the mounting apparatus 100 has substantially the same width as the front lobe 210 of the electronic device 200. Accordingly, when the front lobe of the electronic device 200 is inserted into the front cavity of the mounting apparatus 100, the front lobe cannot move laterally. In an alternative embodiment, the front cavity of the mounting apparatus is wider than the front lobe of the electronic device. In such an embodiment, when the front lobe of the electronic device is inserted into the front cavity of the mounting apparatus, sidewalls of the front cavity limit the lateral movement of the front lobe.

Figure 7:
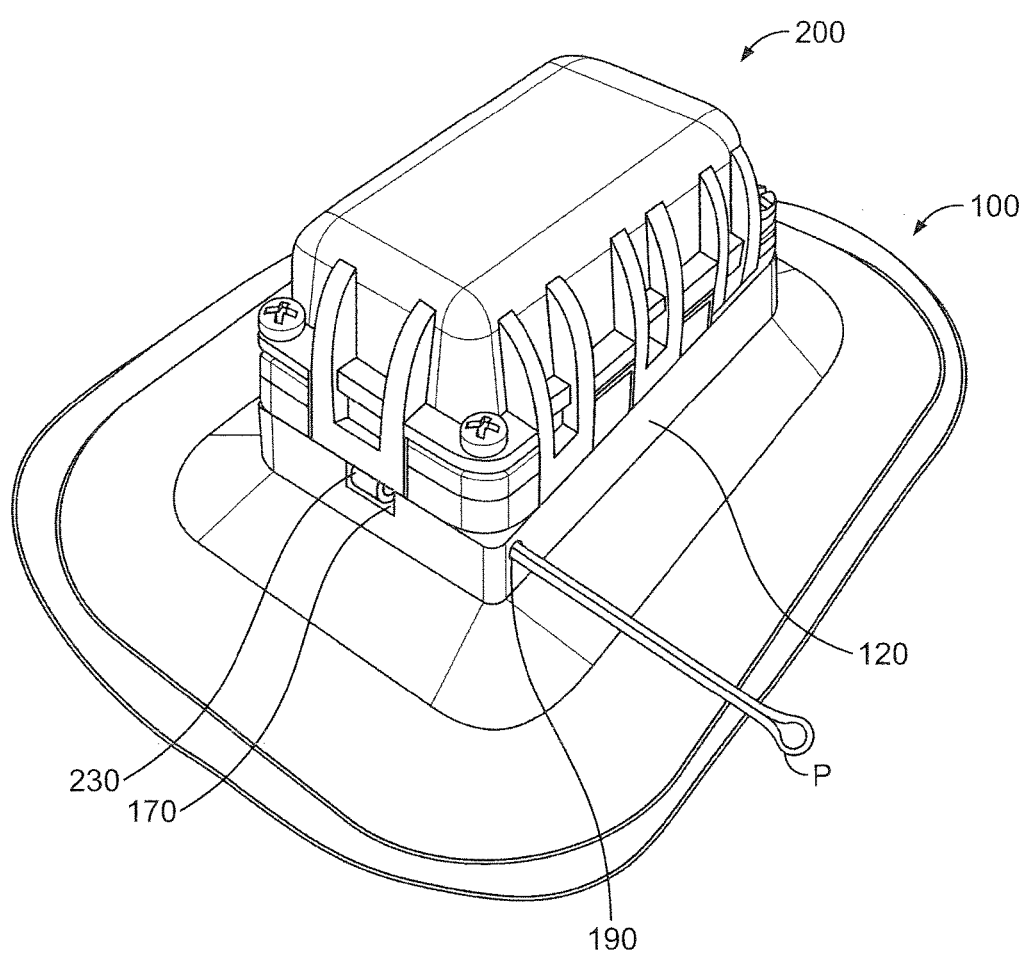
FIG. 7 is a perspective view of a further assembled mounting apparatus 100 and electronic device 200.

FIG. 7 illustrates a perspective view of a further assembled mounting apparatus 100 and electronic device 200. At this stage of assembly, the rear end of the electronic device 200 has been lowered so that the rear lobe 230 is received in the rear cavity 170 of the mounting apparatus 100. The through hole (not shown) of the rear lobe 230 is aligned with the through hole 190 of the mounting apparatus 100 so that the pin P can be inserted through both through holes. The inserted pin P limits movement in the vertical direction as well as the fore-aft direction.

In one embodiment, each of the through holes 190, 230 has a smooth, cylindrical surface. In such an embodiment, the pin P may be a split end pin (i.e., a cotter pin) having two tines that may be bent outward to lock the pin P in place. Alternatively, the pin P may have a threaded end that receives a nut. As another alternative, the pin P may have a through hole to receive a locking pin.

In an alternative embodiment (not shown), one or more of the through holes is threaded. In another alternative embodiment, multiple pins may be employed. For example, a first pin may be inserted through the left side through hole and a second pin may be inserted through the right side through hole. In still another alternative embodiment (not shown), a band clamp may be used to secure the electronic device.

In one embodiment, the rear cavity 170 of the mounting apparatus 100 has substantially the same width as the rear lobe 230 of the electronic device 200. Accordingly, when the rear lobe 230 is inserted into the front cavity of the mounting apparatus 100, the rear lobe cannot move laterally. In an alternative embodiment, the rear cavity of the mounting apparatus is wider than the rear lobe of the electronic device. In such an embodiment, when the rear lobe of the electronic device is inserted into the rear cavity of the mounting apparatus, sidewalls of the cavity would limit the lateral movement of the rear lobe.

In another alternative embodiment (not shown), the mounting apparatus includes a second through hole that is aligned with the through hole of the front lobe of the electronic device. In such an embodiment, a second pin may be employed to further secure the electronic device to the mounting apparatus.

Figure 8:
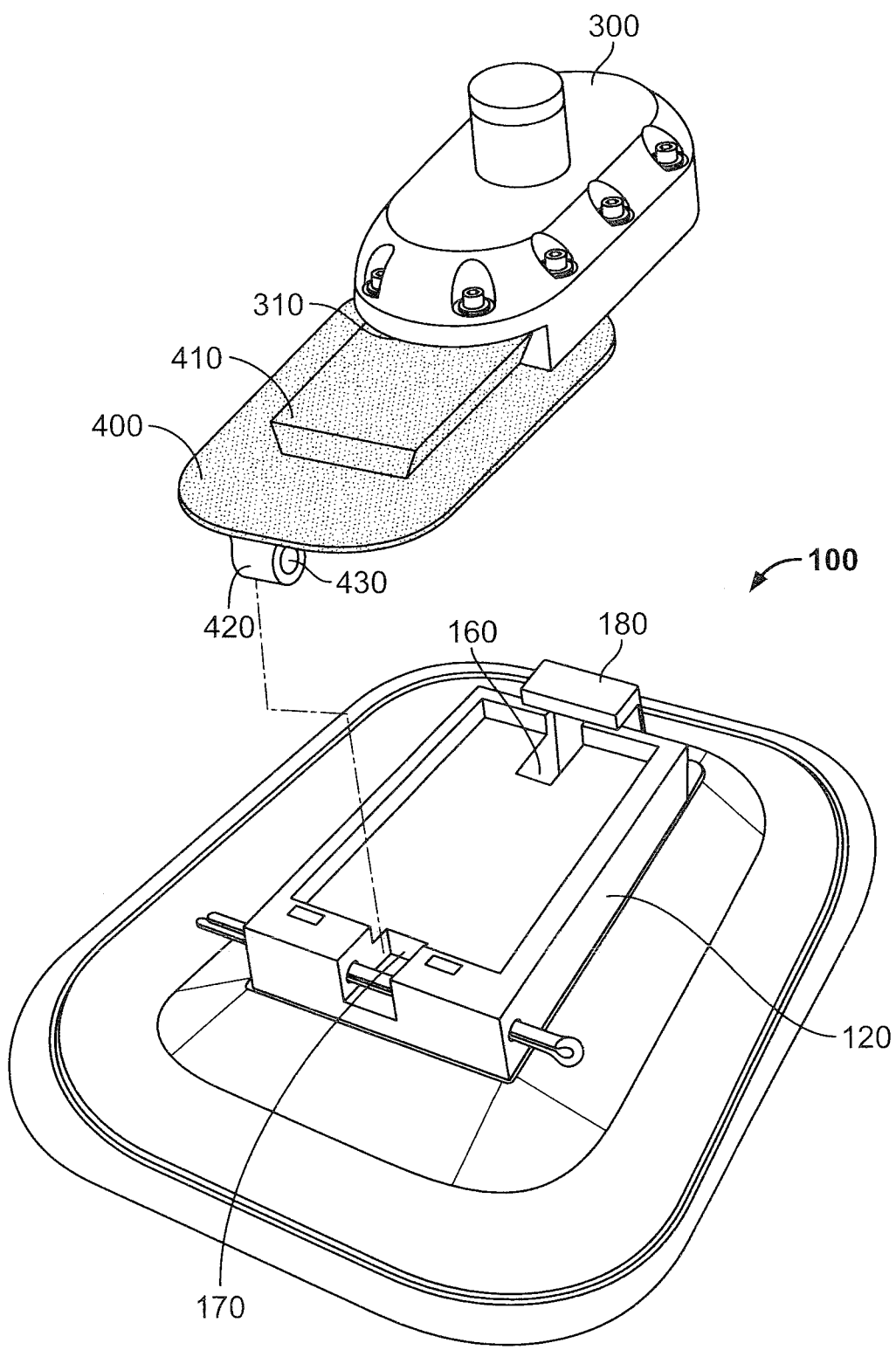
FIG. 8 is an exploded view of the mounting apparatus 100 and an alternative embodiment of an electronic device 300 and one embodiment of an intermediate member 400.

FIG. 8 illustrates an exploded view of the mounting apparatus 100 and an alternative embodiment of an electronic device 300 having a groove 310. The illustrated assembly is substantially the same as the assembly shown in FIGS. 6 and 7, except for the differences described herein. Like reference numerals are used for like components. It should be understood that the alternative embodiments discussed in relation to the mounting apparatus and assembly shown in FIGS. 1-7 may also apply to the embodiment illustrated in FIG. 8.

The assembly further includes an intermediate member 400 having a rib 410 that is slidably received by the groove 310 of the electronic device 300. The electronic device 300 may be retained in position through friction, adhesive or through other fastening means such as a locking pin, set screw, or other fastener.

The intermediate member 400 includes a rear lobe 420 having a through hole 430. The rear lobe 420 is laterally centered on the intermediate member 400 and is aligned with its rear surface. However, it should be understood that the rear lobe may be located elsewhere on the intermediate member. The intermediate member 400 further includes a front lobe (not shown) that is substantially similar to the front lobe 210 of the electronic device 200 illustrated in FIGS. 5-7.

The intermediate member 400 can be mounted to the mounting apparatus 100 in a manner similar to the electronic device 200, as described above with reference to FIGS. 6 and 7.

With continued reference to FIG. 8, the electronic device 300 is slidably attached to the intermediate member 400, and could be retained by a retaining pin (not shown) inserted through the ends of the electronic device 300. In one embodiment, the electronic device 300 is slid onto the intermediate member 400 before the intermediate member is mounted to the mounting apparatus 100. In an alternative embodiment, the electronic device 300 is slid onto the intermediate member 400 after the intermediate member is mounted to the mounting apparatus 100.

Figure 9:
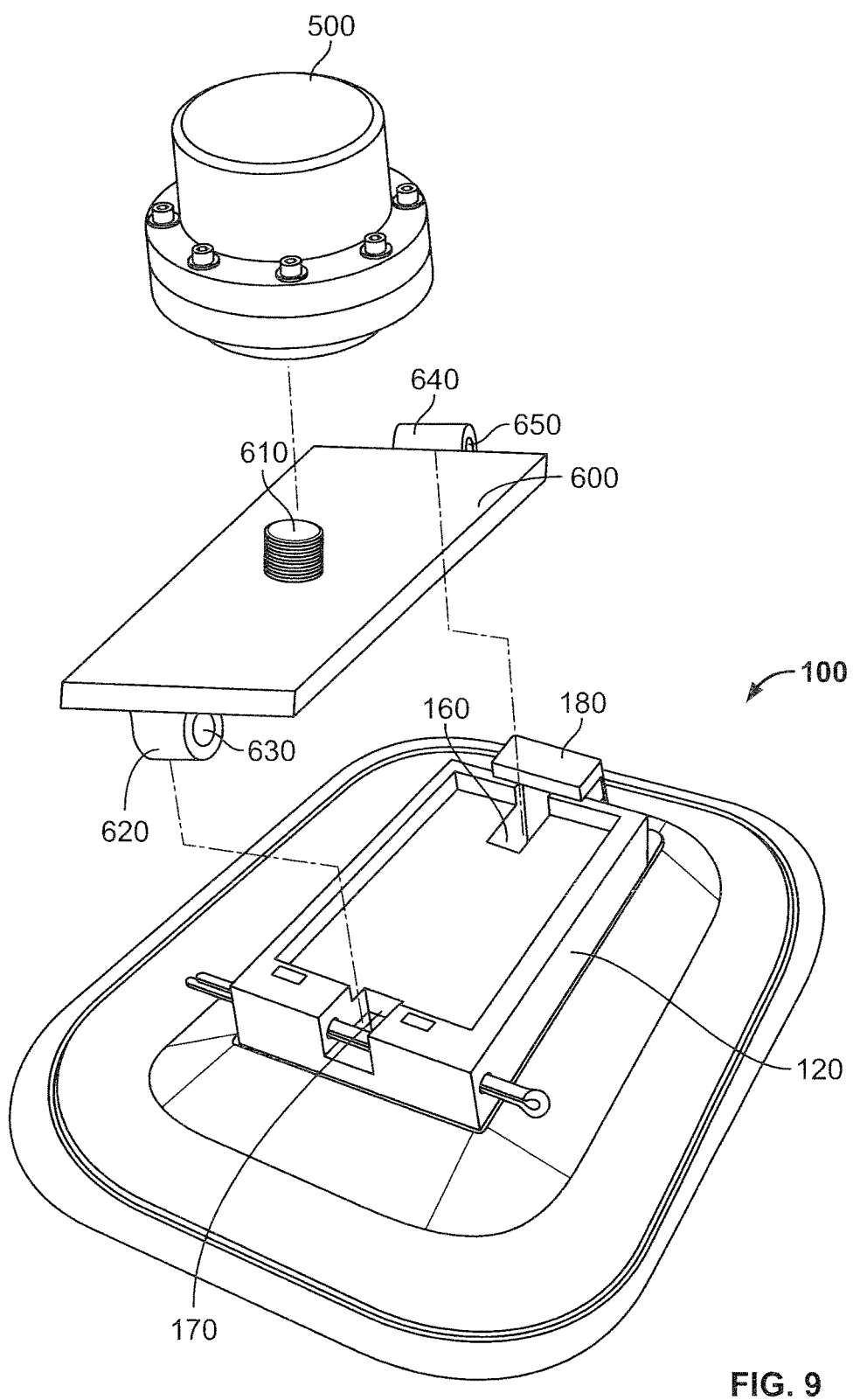
FIG. 9 is an exploded view of the mounting apparatus 100 and another alternative embodiment of an electronic device 500 and an alternative embodiment of an intermediate member 600.

FIG. 9 illustrates an exploded view of the mounting apparatus 100 and another alternative embodiment of an electronic device 500. In the illustrated embodiment, the electronic device 500 includes a threaded aperture (not shown) configured to receive a threaded fastener. The assembly is substantially the same as that shown in FIG. 8, except for the differences described herein. Like reference numerals are used for like components. It should be understood that the alternative embodiments discussed in relation to the previously described assemblies may also apply to the assembly shown in FIG. 9.

The assembly further includes an intermediate member 600 having a threaded fastener 610 that is received by the threaded aperture of the electronic device 500. The intermediate member 400 includes a rear lobe 620 having a through hole 630. The rear lobe 620 is laterally centered on the intermediate member 600 and is aligned with its rear surface. However, it should be understood that the rear lobe may be located elsewhere on the intermediate member. The intermediate member 600 further includes a front lobe 640 having a through hole 650. The front lobe 640 is laterally centered on the intermediate member 600. Alternatively, it may be located elsewhere on the intermediate member. In an alternative embodiment (not shown), the through hole of the front lobe may be omitted.

The intermediate member 600 can be mounted to the mounting apparatus 100 in a manner similar to the electronic device 200, as described above with reference to FIGS. 6 and 7.

In the illustrated embodiment, the electronic device 500 is mounted solely by the threaded fastener 610. In an alternative embodiment (not shown), the electronic device 500 is further secured by clamps or straps. The clamps or straps may directly engage the electronic device 500, or one or more intermediate members (not shown) may be positioned between the clamps and electronic device to further secure the electronic device.

Figure 10:
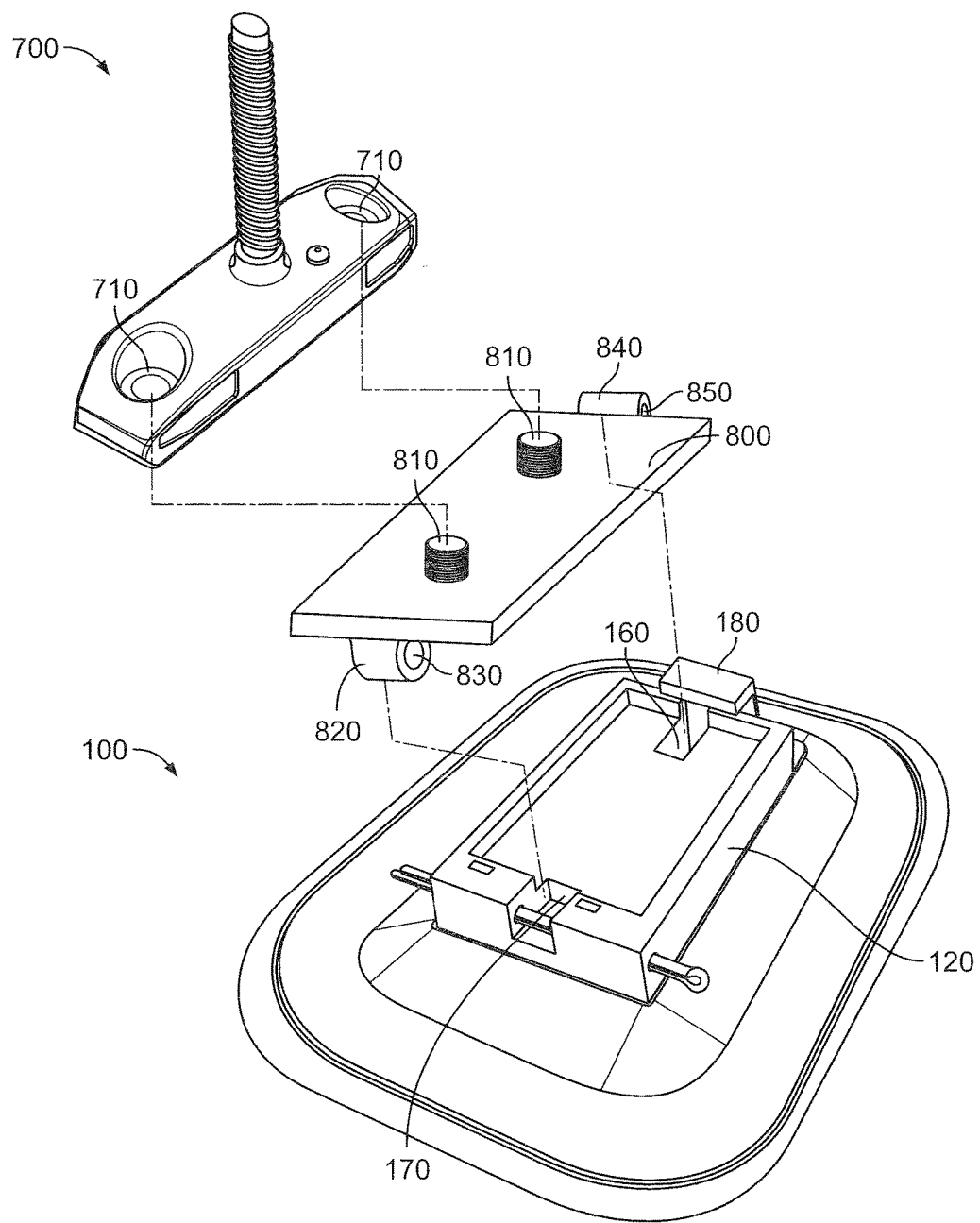
FIG. 10 is an exploded view of the mounting apparatus 100 and yet another alternative embodiment of an electronic device 700 and another alternative embodiment of an intermediate member 800.

FIG. 10 illustrates an exploded view of the mounting apparatus 100 and another alternative embodiment of an electronic device 700. In the illustrated embodiment, the electronic device 700 includes a pair apertures 710 configured to receive a fastener. The assembly is substantially the same as that shown in FIGS. 8 and 9, except for the differences described herein. Like reference numerals are used for like components. It should be understood that the alternative embodiments discussed in relation to the previously described assemblies may also apply to the assembly shown in FIG. 10.

The assembly includes an intermediate member 800 having a pair of threaded fasteners 810 that are received by apertures of the electronic device 700. The intermediate member 800 includes a rear lobe 820 having a through hole 830. The rear lobe 820 is laterally centered on the intermediate member 800 and is aligned with its rear surface. However, it should be understood that the rear lobe may be located elsewhere on the intermediate member. The intermediate member 800 further includes a front lobe 840 having a through hole 850. The front lobe 840 is laterally centered on the intermediate member 800. Alternatively, it may be located elsewhere on the intermediate member. In an alternative embodiment (not shown), the through hole of the front lobe may be omitted.

The intermediate member 800 can be mounted to the mounting apparatus 100 in a manner similar to the electronic device 200, as described above with reference to FIGS. 6 and 7.

In the illustrated embodiment, the electronic device 700 is mounted by inserting the threaded fasteners 810 through the cavities 710. A pair of nuts (not shown) is then used to retain the threaded fasteners. In one embodiment, the cavities are smooth. In an alternative embodiment, the cavities are threaded and the threaded fasteners are rotatable. In another alternative embodiment (not shown), the fasteners are not threaded but are instead retained by a retaining pin or other retaining means. In an alternative embodiment (not shown), the electronic device 700 is further secured by clamps or straps. The clamps or straps may directly engage the electronic device 700, or one or more intermediate members (not shown) may be positioned between the clamps and electronic device to further secure the electronic device.

Figure 11:
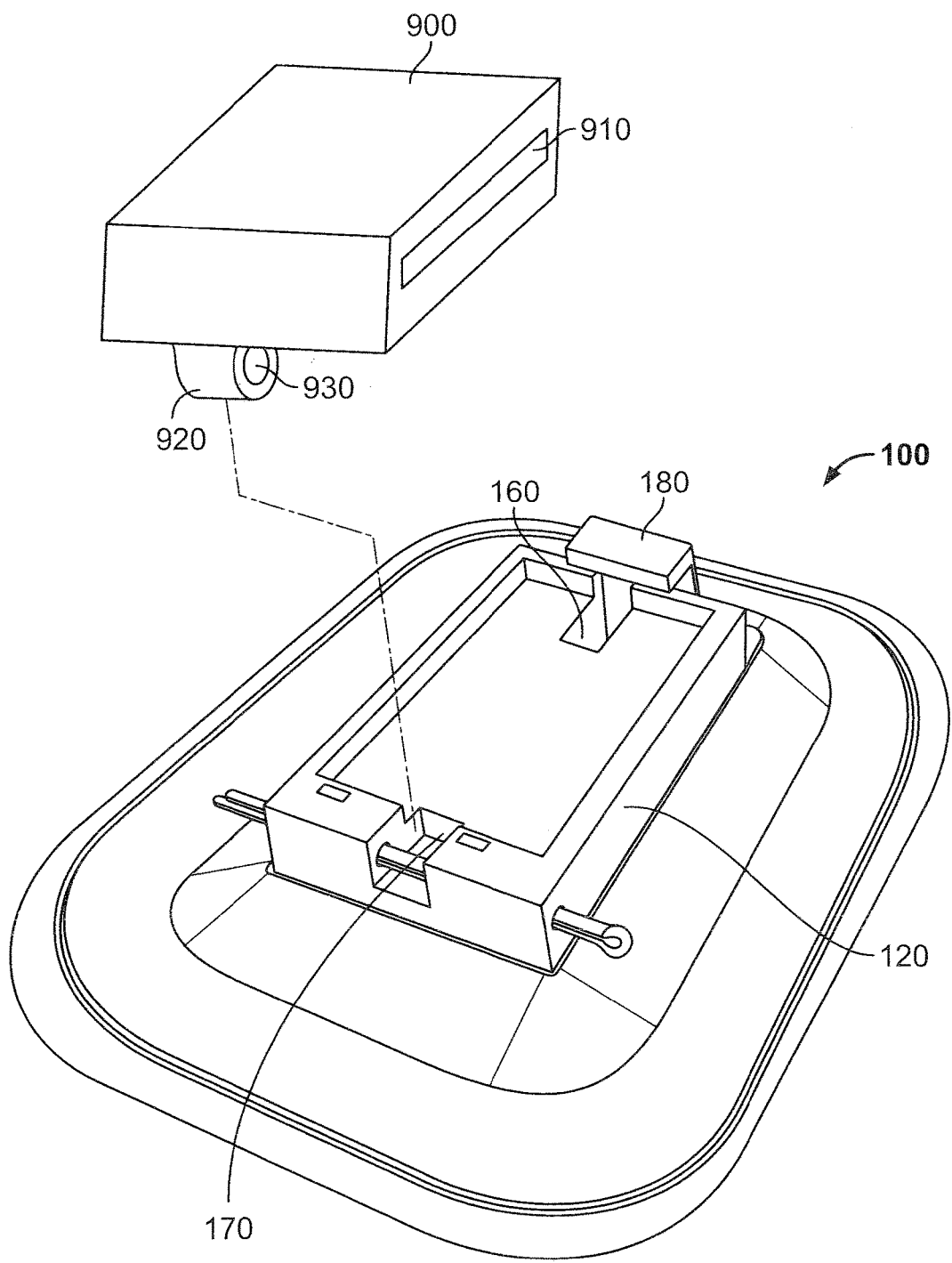
FIG. 11 is an exploded view of the mounting apparatus 100 and another alternative embodiment of an intermediate member 900.

FIG. 11 illustrates an exploded view of the mounting apparatus 100 and another alternative embodiment of an intermediate member 900 having a slot 910 configured to receive a strap (not shown). The strap may include fasteners such as hook-and-loop fasteners, hook-and-hook fasteners, snaps, buttons, and other known fasteners. The strap may be used to secure an electronic device to a top surface of the intermediate member 900. Additionally, adhesive may be used to further secure the electronic device to the intermediate member. While the intermediate member 900 is shown as having a flat top surface, in an alternative embodiment (not shown), the intermediate member may have a recessed top surface.

In an alternative embodiment (not shown), the intermediate member has fixed straps extending from its sides, instead of a slot configured to receive a strap.

The intermediate member 900 includes a rear lobe 920 having a through hole 930. The rear lobe 920 is laterally centered on the intermediate member 900 and is aligned with its rear surface. However, it should be understood that the rear lobe may be located elsewhere on the intermediate member. The intermediate member 900 further includes a front lobe (not shown) that is substantially similar to the front lobe 210 of the electronic device 200 illustrated in FIGS. 5-7.

The intermediate member 900 can be mounted to the mounting apparatus 100 in a manner similar to the electronic device 200 as described above with reference to FIGS. 6 and 7.

Figure 12:
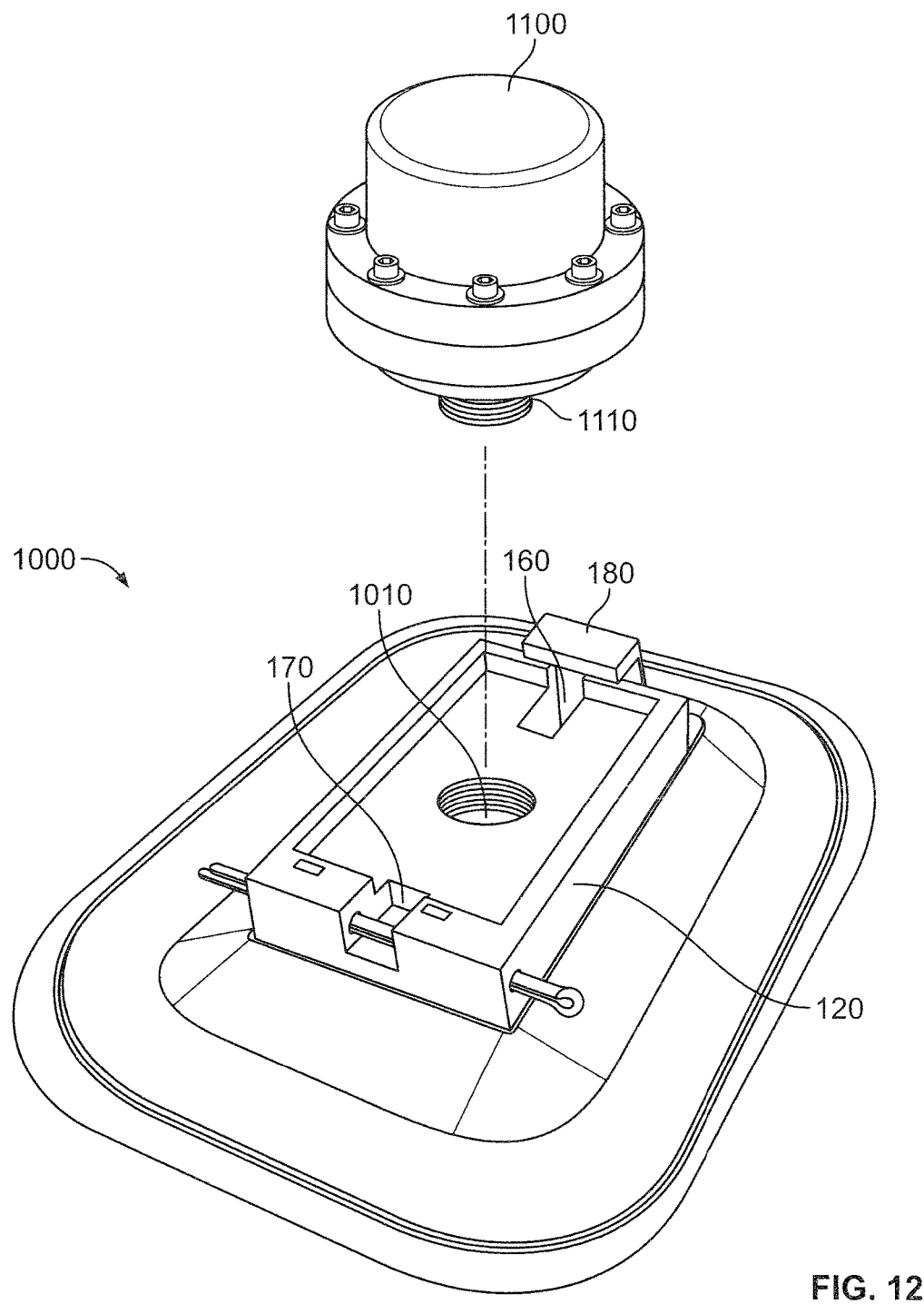
FIG. 12 is an exploded view of an alternative embodiment of a mounting apparatus 1000 and still another alternative embodiment of an electronic device 1100.

FIG. 12 illustrates an exploded view of an alternative embodiment of a mounting apparatus 1000 and still another alternative embodiment of an electronic device 1100. The mounting apparatus 1000 is substantially the same as the mounting apparatus 100 shown in the previous figures, except for the differences described herein. Like reference numerals are used for like components. It should be understood that the alternative embodiments discussed in relation to the mounting apparatus 100 may also apply to the mounting apparatus 1000.

In the illustrated embodiment, the mounting apparatus 1000 includes a pedestal 120, front cavity 160, rear cavity 170, and guard 180, similar to those of the mounting apparatus 100. Additionally, the mounting apparatus 1000 further includes a substantially cylindrical central cavity 1010 having internal threads.

The electronic device 1100 includes a threaded fastener 1110 that corresponds to the internal threads of the central cavity 1010. The threaded fastener 1110 may also be referred to as an intermediate member. The electronic device 1100 may be mounted to the mounting apparatus 1000 by aligning the threaded fastener 1110 with the central cavity 1010 and rotating the electronic device 1100 and the threaded fastener 1110 until the electronic device 1100 is secure.

In one embodiment, the electronic device 1100 is mounted solely by the threaded fastener 1110 and the central cavity 1010. In an alternative embodiment (not shown), the electronic device 1100 is further secured by clamps or straps. The clamps or straps may directly engage the electronic device 1100, or one or more intermediate members (not shown) may be positioned between the clamps and the electronic device to further secure the electronic device. In an alternative embodiment (not shown), both the electronic device and the intermediate member include cavities with internal threads, and a separate threaded rod is mated with both the electronic device and the intermediate member.

Figure 13:
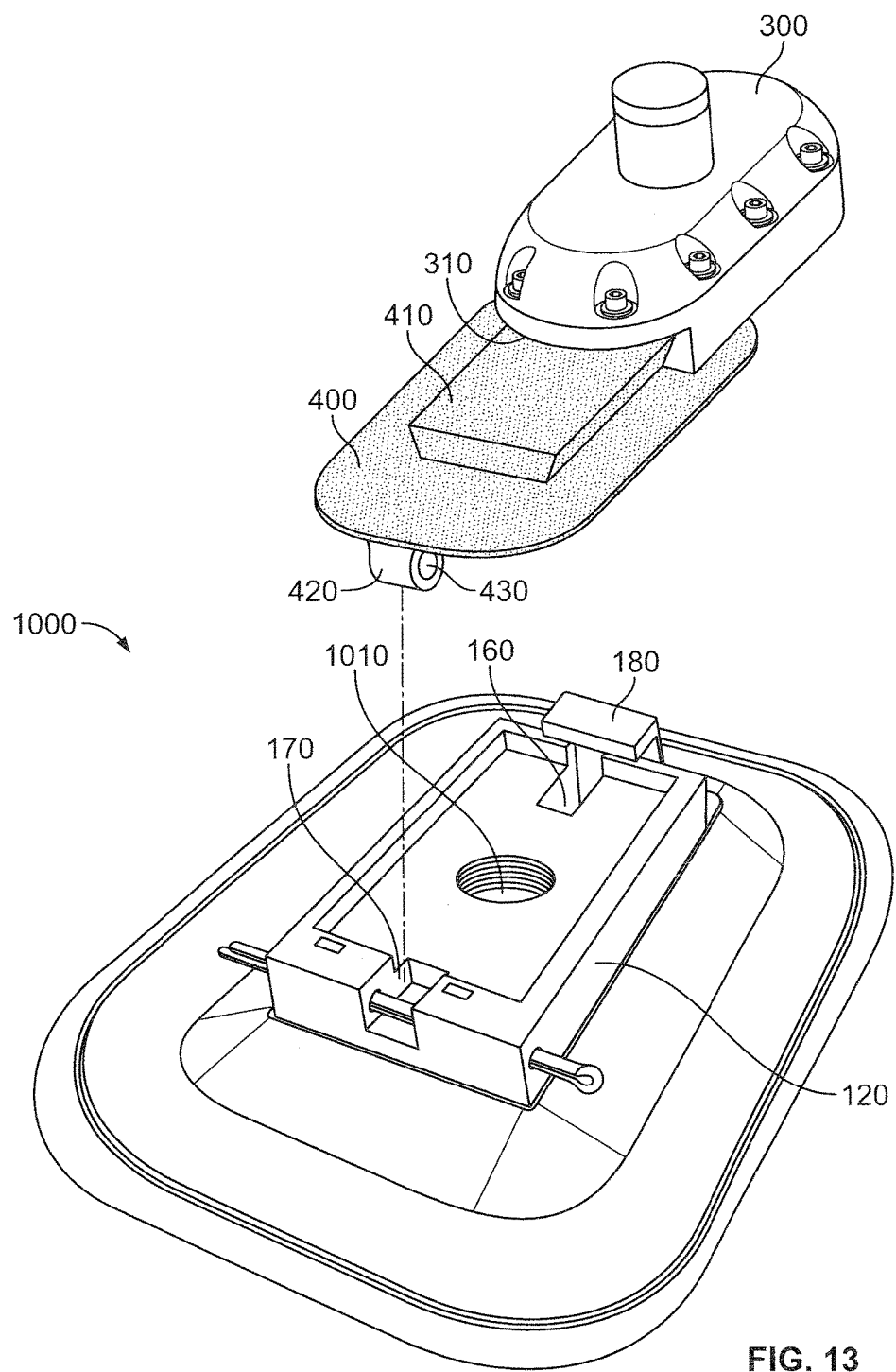
FIG. 13 is an exploded view of the alternative embodiment of the mounting apparatus 1000 of FIG. 12 with the electronic device 300 and the intermediate member 400 of FIG. 8.

The front and rear cavities 160, 170 of the mounting apparatus 1000 are not used in this mounting configuration, but their presence allows for different objects to be mounted in other configurations. One example of such a configuration is shown in FIG. 13, which illustrates an exploded view of the alternative embodiment of the mounting apparatus 1000 with the electronic device 300 and the intermediate member 400 of FIG. 8. In this embodiment, the front lobe (not shown) and rear lobe 420 of the intermediate member 400 are received in the front and rear cavities 160, 170 of the mounting apparatus 1000, in the same manner that they are received in the corresponding cavities of the mounting apparatus 100 described above.

Additionally, a solid plug (not shown) may be used to fill in the central cavity 1010 of the mounting apparatus 1000 in instances where the cavity is not used. Such a plug may be constructed of an elastomeric material or metal.

It should be readily apparent that the mounting apparatus 1000 can also be employed with the electronic device 100 of FIGS. 5-7, the alternative electronic device 500 and intermediate member 600 of FIG. 9, the alternative electronic device 700 and alternative intermediate member 800 of FIG. 10, or the alternative intermediate member 900 of FIG. 11. These embodiments are not shown for space considerations.

Figure 14:
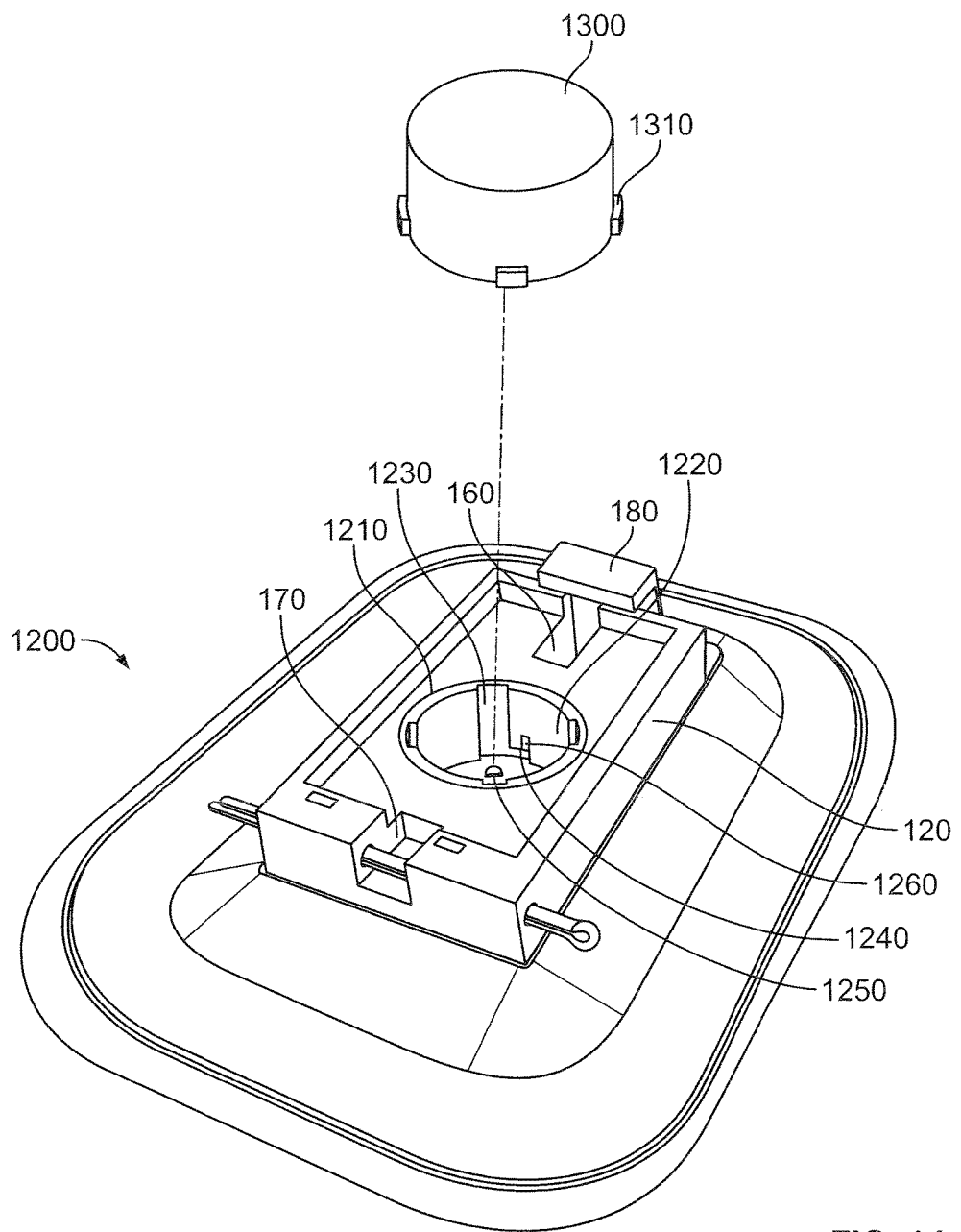
FIG. 14 is another alternative embodiment of a mounting apparatus 1200 and yet another alternative embodiment of an electronic device 1300.

FIG. 14 illustrates an exploded view of another alternative embodiment of a mounting apparatus 1200 and yet another alternative embodiment of an electronic device 1300. The electronic device 1300 includes a plurality of tabs 1310. The tabs may also be referred to as intermediate members or "bayonets."

The mounting apparatus 1200 is substantially the same as the mounting apparatuses 100 and 1000 shown in the previous figures, except for the differences described herein. Like reference numerals are used for like components. It should be understood that the alternative embodiments discussed in relation to the mounting apparatuses 100 and 1000 may also apply to the mounting apparatus 1200.

In the illustrated embodiment, the mounting apparatus 1200 includes a pedestal 120, front cavity 160, rear cavity 170, and guard 180, similar to those of the mounting apparatuses 100 and 1000. Additionally, the mounting apparatus 1200 further includes a substantially cylindrical central cavity 1210 that has sidewall 1220 with a plurality of substantially vertical grooves 1230 disposed therein. The substantially vertical grooves 1230 are configured to receive the tabs 1310 of the electronic device 1300. At the base of the sidewall 1220, horizontal grooves 1240 extend substantially orthogonally from the substantially vertical grooves 1230. A biasing member 1250 is disposed in the bottom of the central cavity. Exemplary biasing members include rubber members and springs. It should be understood that any thermoplastic or thermoset material may be employed.

To mount the electronic device 1300 to the mounting apparatus 1200, the tabs 1310 of the electronic device 1300 are aligned with the substantially vertical grooves 1230 of the central cavity 1210. The electronic device 1300 is then pushed downwards until it reaches the bottom surface of the central cavity. The electronic device 1300 is then rotated such that the tabs 1310 are disposed in the horizontal grooves 1240. The biasing member 1250 biases the electronic device 1300 upwards, such that the tabs 1310 are biased into locking notches 1260 that extend upwards from the ends of the horizontal grooves 1240. In an alternative embodiment (not shown), the central cavity does not include locking notches, and the tabs are biased such that they abut the walls of the horizontal grooves 1240. In either manner, the electronic device 1300 may be prevented from rotating within the central cavity 1210.

In one embodiment, the electronic device 1300 is mounted solely by the locking notches 1260 or horizontal grooves 1240 in the central cavity 1210. In an alternative embodiment (not shown), the electronic device 1300 is further secured by clamps. The clamps may directly engage the electronic device 1300, or one or more intermediate members (not shown) may be positioned between the clamps and electronic device to further secure the electronic device.

Figure 15:
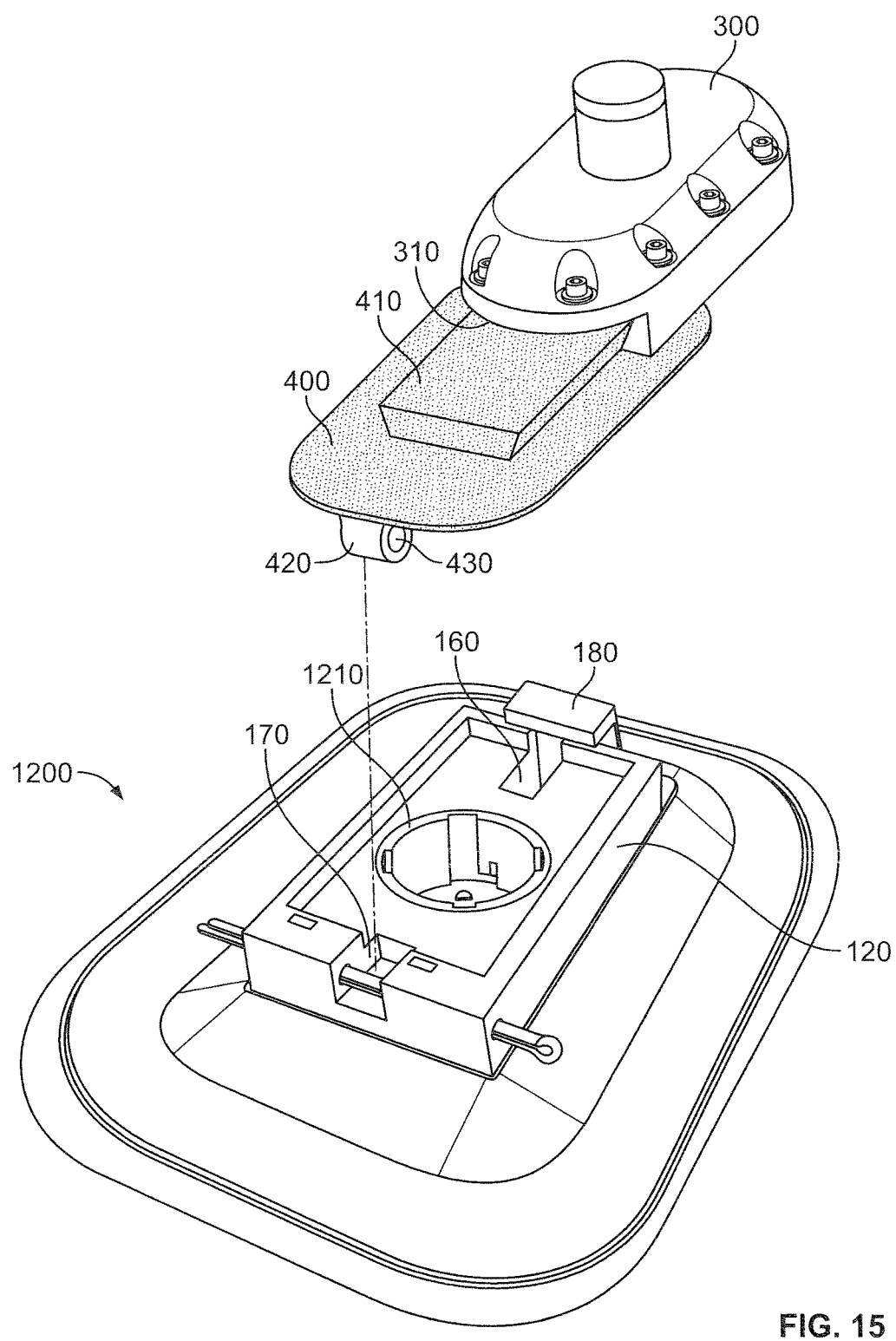
FIG. 15 is an exploded view of the alternative embodiment of the mounting apparatus 1200 of FIG. 14 with the electronic device 300 and the intermediate member 400 of FIG. 8.

The front and rear cavities 160, 170 of the mounting apparatus 1200 are not used in this mounting configuration, but their presence allows for different objects to be mounted in other configurations. One example of such a configuration is shown in FIG. 15, which illustrates an exploded view of the alternative embodiment of the mounting apparatus 1200 with the electronic device 300 and the intermediate member 400 of FIG. 8. In this embodiment, the front lobe (not shown) and rear lobe 420 of the intermediate member 400 are received in the front and rear cavities 160, 170 of the mounting apparatus 1200, in the same manner that they are received in the corresponding cavities of the mounting apparatus 100 described above.

Additionally, a solid plug (not shown) may be used to fill in the central cavity 1210 of the mounting apparatus 1200 in instances where the central cavity is not used. Such a plug may be constructed of an elastomeric material or metal.

It should be readily apparent that the mounting apparatus 1200 can also be employed with the electronic device 100 of FIGS. 5-7, the alternative electronic device 500 and intermediate member 600 of FIG. 9, the alternative electronic device 700 and alternative intermediate member 800 of FIG. 10, or the alternative intermediate member 900 of FIG. 11. These embodiments are not shown for space considerations.

Figure 16:
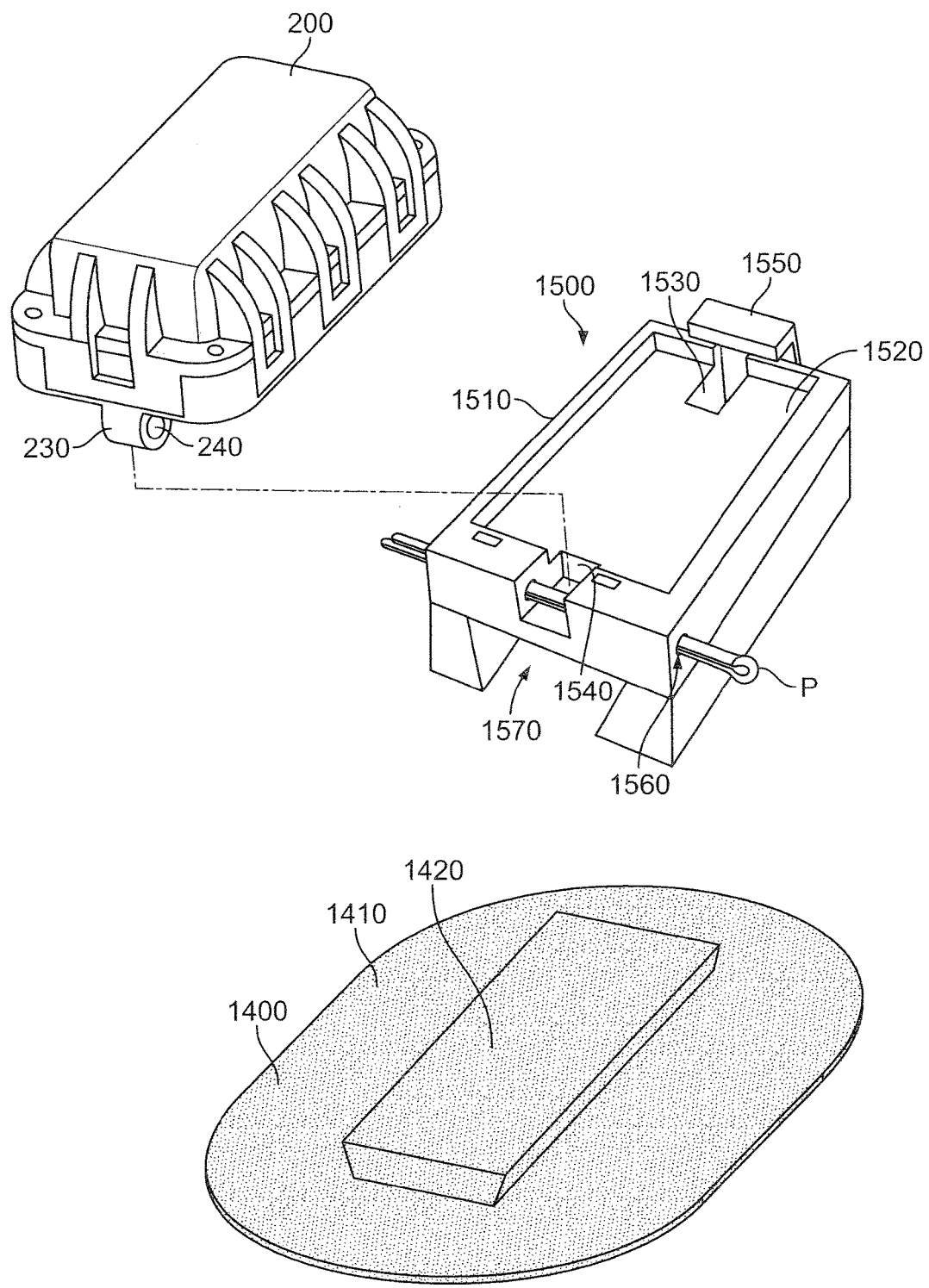
FIG. 16 is an exploded view of the electronic device 200 of FIGS. 5-7 with another alternative embodiment of a mounting apparatus 1400 and another alternative embodiment of an intermediate member 1500.

FIG. 16 is an exploded view of the electronic device 200 of FIGS. 5-7 with another alternative embodiment of a mounting apparatus 1400 and another alternative embodiment of an intermediate member 1500. In this embodiment, the mounting apparatus 1400 includes a ply 1410 and a rib 1420 that extends upwards from the ply. The ply 1410 is affixable to an innerliner of a tire (not shown) and is constructed of a resilient material, such as those materials described above with reference to the ply 110. The mounting apparatus 1400 can be mounted to a tire in a manner similar to those described above with respect to the mounting apparatus 100.

The intermediate member 1500 includes features substantially similar to those of the pedestal 120 of the mounting apparatus 100 of FIG. 1. Specifically, the intermediate member 1500 includes a rim 1510 that defines a recessed top planar surface 1520. The intermediate member 1500 further includes a front cavity 1530 and a rear cavity 1540 disposed in the top planar surface 1520. A portion of the front cavity 1530 is covered by a guard 1550. The rear sides of the intermediate member 1500 include a through hole 1560 that extends through the entire rear end of the intermediate member. The through hole 1560 is sized to receive a pin P. The through hole 1560 is positioned such that it crosses the rear cavity 1540.

The intermediate member 1500 is configured to receive the electronic device 200 in the same manner that the pedestal 120 of the mounting apparatus 100 is described as receiving the electronic device above. It should be understood that the intermediate member 1500 may be varied in the same manners described above with respect to the pedestal 120 of the mounting apparatus 100.

The intermediate member 1500 further includes a groove 1570 that corresponds to the shape of the rib 1420 of the mounting apparatus 1400. The rib 1420 is slidably received by the groove 1570. The intermediate member 1500 may be retained in position through friction, adhesive or through other fastening means such as a locking pin, set screw, or other fastener.

Figure 17:
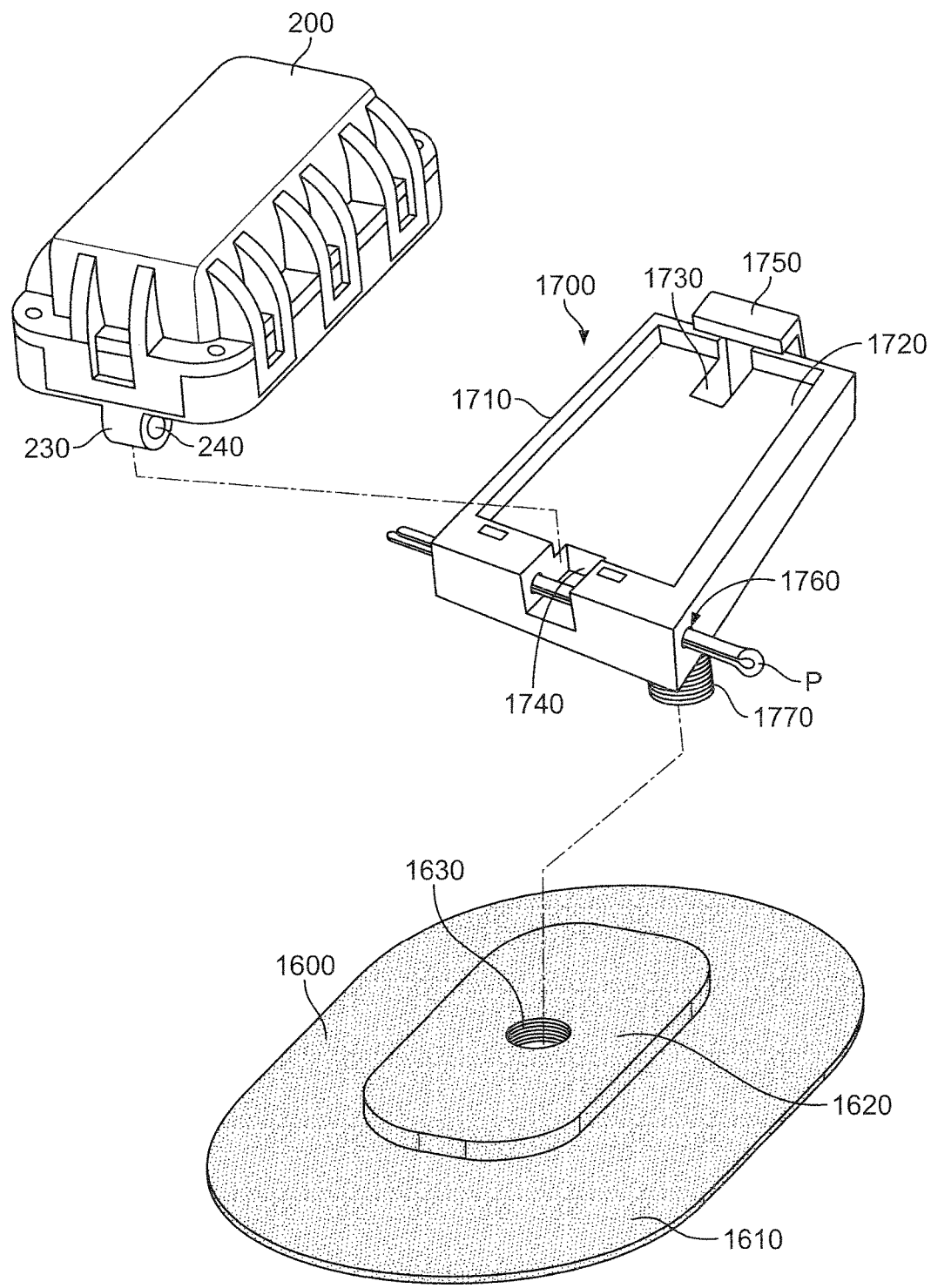
FIG. 17 is an exploded view of the electronic device 200 of FIGS. 5-7 with yet another alternative embodiment of a mounting apparatus 1600 and yet another alternative embodiment of an intermediate member 1700.

FIG. 17 is an exploded view of the electronic device 200 of FIGS. 5-7 with still another alternative embodiment of a mounting apparatus 1600 and still another alternative embodiment of an intermediate member 1700. In this embodiment, the mounting apparatus 1600 includes a ply 1610 and a pedestal 1620 that extends upwards from the ply. The pedestal 1620 includes a threaded cavity 1630 in its top surface.

The ply 1610 is affixable to an innerliner of a tire (not shown) and is constructed of a resilient material, such as those materials described above with reference to the ply 110. The mounting apparatus 1600 can be mounted to a tire in a manner similar to those described above with respect to the mounting apparatus 100.

The intermediate member 1700 includes features substantially similar to those of the pedestal 120 of the mounting apparatus 100 of FIG. 1. Specifically, the intermediate member 1700 includes a rim 1710 that defines a recessed top planar surface 1720. The intermediate member 1700 further includes a front cavity 1730 and a rear cavity 1740 disposed in the top planar surface 1720. A portion of the front cavity 1730 is covered by a guard 1750. The rear sides of the intermediate member 1700 include a through hole 1760 that extends through the entire rear end of the intermediate member. The through hole 1760 is sized to receive a pin P. The through hole 1760 is positioned such that it crosses the rear cavity 1740.

The intermediate member 1700 is configured to receive the electronic device 200 in the same manner that the pedestal 120 of the mounting apparatus 100 is described as receiving the electronic device above. It should be understood that the intermediate member 1700 may be varied in the same manners described above with respect to the pedestal 120 of the mounting apparatus 100.

The intermediate member 1700 further includes a threaded rod 1770 that corresponds to threads of the threaded cavity 1630 of the mounting apparatus 1600. The threaded rod 1770 may be fixedly attached to the intermediate member 1700 or it may be received in a threaded cavity (not shown) in a bottom surface of the intermediate member.

In one embodiment, the intermediate member 1700 is connected to the mounting apparatus 1600 solely through the threaded rod 1770. In alternative embodiments, adhesive or other fastening means may be employed to retain the intermediate member. Exemplary fastening means include locking pins, set screws, and other fasteners.

In an alternative embodiment (not shown), the pedestal includes a threaded rod that extends upwards from its top surface. The threaded rod is then received by a corresponding threaded cavity in the intermediate member.

In another alternative embodiment (not shown), the pedestal includes a cavity having vertical and horizontal grooves, such as those present in the cavity 1210 in the mounting apparatus 1200 shown in FIG. 14. Such a cavity can receive a tabbed member extending from an intermediate member.

Figure 18:
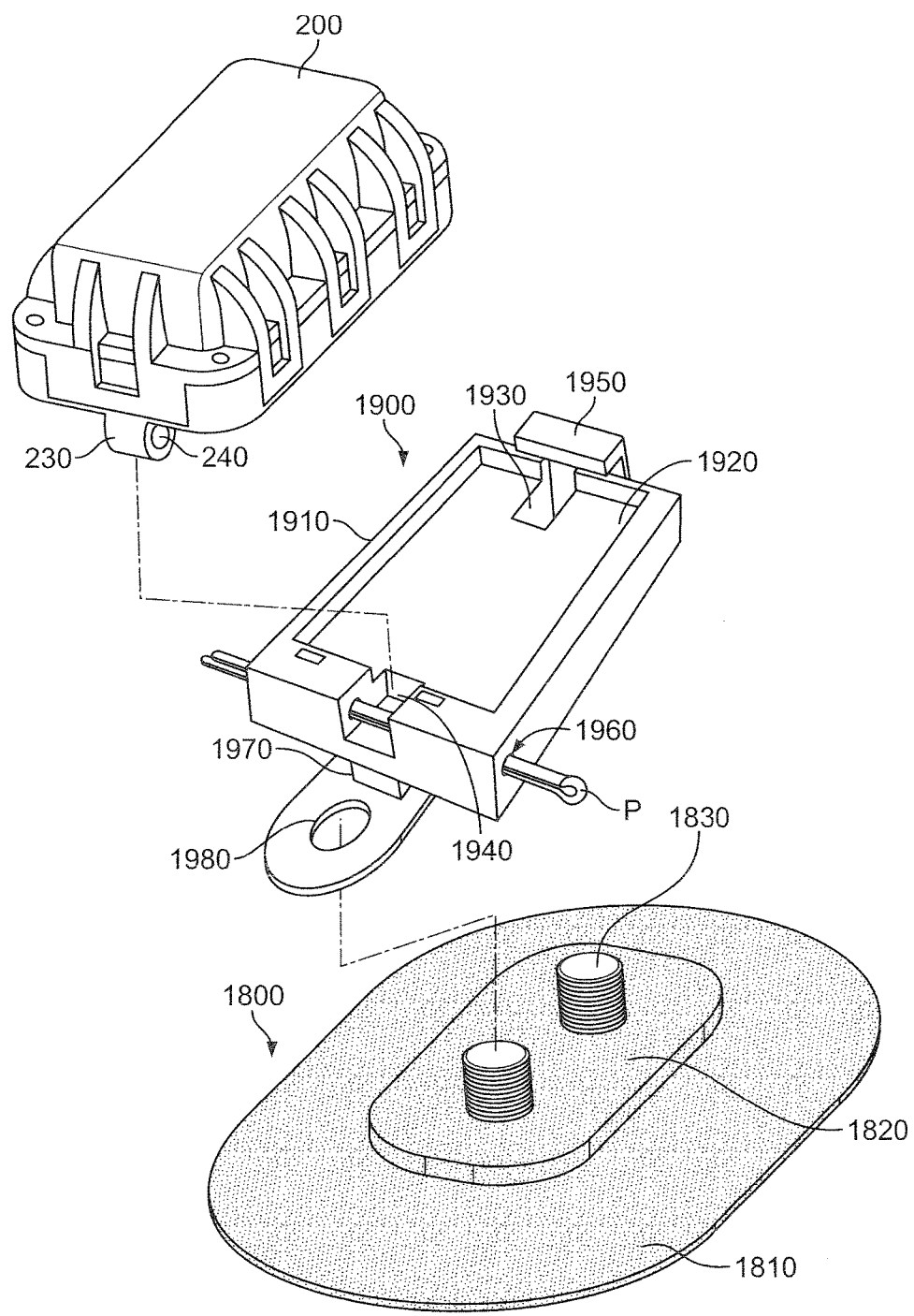
FIG. 18 is an exploded view of the electronic device 200 of FIGS. 5-7 with still another alternative embodiment of a mounting apparatus 1800 and still another alternative embodiment of an intermediate member 1900.

FIG. 18 is an exploded view of the electronic device 200 of FIGS. 5-7 with still another alternative embodiment of a mounting apparatus 1800 and still another alternative embodiment of an intermediate member 1900. In this embodiment, the mounting apparatus 1800 includes a ply 1810 and a pedestal 1820 that extends upwards from the ply. The pedestal 1820 includes a pair of threaded rods 1830 that extend from its top surface. In one embodiment, the threaded rods 1830 are fixedly attached to the pedestal 1820. In an alternative embodiment, the threaded rods are received in corresponding threaded cavities in the pedestal 1820.

The ply 1810 is affixable to an innerliner of a tire (not shown) and is constructed of a resilient material, such as those materials described above with reference to the ply 110. The mounting apparatus 1800 can be mounted to a tire in a manner similar to those described above with respect to the mounting apparatus 100.

The intermediate member 1900 includes features substantially similar to those of the pedestal 120 of the mounting apparatus 100 of FIG. 1. Specifically, the intermediate member 1900 includes a rim 1910 that defines a recessed top planar surface 1920. The intermediate member 1900 further includes a front cavity 1930 and a rear cavity 1940 disposed in the top planar surface 1920. A portion of the front cavity 1930 is covered by a guard 1950. The rear sides of the intermediate member 1900 include a through hole 1960 that extends through the entire rear end of the intermediate member. The through hole 1960 is sized to receive a pin P. The through hole 1960 is positioned such that it crosses the rear cavity 1940.

The intermediate member 1900 is configured to receive the electronic device 200 in the same manner that the pedestal 120 of the mounting apparatus 100 is described as receiving the electronic device above. It should be understood that the intermediate member 1900 may be varied in the same manners described above with respect to the pedestal 120 of the mounting apparatus 100.

The intermediate member 1900 further includes an inverted T-shaped member 1970 extending from a bottom surface. The inverted T-shaped member 1970 includes a pair of apertures 1980 (only one aperture is visible from this view). The apertures 1980 are positioned to receive the threaded rods 1830 of the mounting apparatus 1800. In one embodiment, the apertures 1980 have smooth sidewalls and the threaded rods 1830 are secured using nuts (not shown). In an alternative embodiment, the apertures are threaded. In such an embodiment, the threaded rods are not fixedly attached to the mounting apparatus, but are instead received in both the threaded apertures of the intermediate member and corresponding threaded cavities of the intermediate member.

In one embodiment, the intermediate member 1900 is connected to the mounting apparatus 1800 solely through the threaded rods 1830. In alternative embodiments, adhesive or other fastening means may be employed to retain the intermediate member. Exemplary fastening means include locking pins, set screws, and other fasteners.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An assembly for mounting an object inside of a tire, the assembly comprising:
   a rubber ply having a first side affixable to an interior surface of a tire;
   a pedestal extending from a second side of the rubber ply, the pedestal having a top surface and at least one sidewall,
      wherein the pedestal has a front cavity in the top surface proximate to a front end of the pedestal, the front cavity being defined by at least one front cavity sidewall and a front cavity floor, the front cavity sidewall and the front cavity floor both being formed of the same material,
      wherein the pedestal has a rear cavity in the top surface proximate to a rear end of the pedestal, the rear cavity being defined by at least one rear cavity sidewall and a rear cavity floor, the rear cavity sidewall and the rear cavity floor both being formed of the same material, and
      wherein the pedestal has a central cavity in the top surface between the front cavity and the rear cavity;
   an electronic device; and
   an intermediate member connected to the electronic device and further connected to the pedestal such that at least a portion of the intermediate member is disposed in at least one of the front cavity, the central cavity, and the rear cavity.

2. The assembly of claim 1, wherein the central cavity has internal threads.

3. The assembly of claim 2, wherein the intermediate member includes a threaded rod connected to the electronic device, the threaded rod having threads corresponding to the internal threads of the central cavity.

4. The assembly of claim 1, wherein the intermediate member includes a front lobe received by the front cavity, and a rear lobe received by the rear cavity.

5. The assembly of claim 4, wherein the intermediate member further includes a rib, and the electronic device has a groove configured to receive the rib.

6. The assembly of claim 4, wherein the intermediate member further includes a threaded fastener, and the electronic device has an aperture configured to receive the threaded fastener.

7. The assembly of claim 6, wherein the intermediate member further has a second threaded fastener, and the electronic device has a second aperture configured to receive the second threaded fastener.

8. The assembly of claim 1, wherein the central cavity has vertical and horizontal grooves.

9. The assembly of claim 8, wherein the intermediate member includes at least one tab configured to be received by the vertical and horizontal grooves.

10. An apparatus for mounting an object within a tire, the apparatus comprising:
    a ply having a first side for mounting against an innerliner of the tire;
    a pedestal extending upwards from a second side of the ply, the pedestal having a recessed planar top surface, with an elongated front cavity, an elongated rear cavity, and a substantially cylindrical central cavity disposed therein,
       wherein the elongated front cavity is defined by a front cavity sidewall and a front cavity floor, the front cavity sidewall and the front cavity floor both being formed of the same material,
       wherein the elongated rear cavity is defined by a rear cavity sidewall and a rear cavity floor, the rear cavity sidewall and the rear cavity floor both being formed of the same material,
       wherein the substantially cylindrical cavity is defined by a cylindrical cavity sidewall, and
       wherein the cylindrical cavity sidewall includes mating structure selected from the group consisting of threads and a plurality of downwardly extending slots.

11. The apparatus of claim 10, wherein the object mounted within a tire is an electronic device.

12. The apparatus of claim 10, wherein the pedestal is substantially rectangular when viewed from above.

13. The apparatus of claim 12, wherein the pedestal further includes a through hole that extends through a rear end of the pedestal.

14. The apparatus of claim 13, wherein the through hole is sized to receive a pin, and wherein the through hole is positioned such that it crosses the elongated rear cavity.

15. A tire monitoring kit comprising:
    a mounting apparatus having a plurality of mounting configurations, including at least a front cavity and a rear cavity,
       wherein the front cavity is defined by a front cavity sidewall and a front cavity floor, the front cavity sidewall and the front cavity floor both being formed of the same material, and
       wherein the rear cavity is defined by a rear cavity sidewall and a rear cavity floor, the rear cavity sidewall and the rear cavity floor both being formed of the same material;
    an electronic device;
    means for connecting the electronic device to the mounting apparatus using less than all of the plurality of mounting configurations.

16. The tire monitoring kit of claim 15, wherein the mounting apparatus includes a pedestal having a top surface and at least one sidewall.

17. The tire monitoring kit of claim 16, wherein the plurality of mounting configurations further includes a central cavity disposed in the top surface of the pedestal.

18. The tire monitoring kit of claim 16, wherein the front cavity is disposed in the top surface of the pedestal and the rear cavity is disposed in the top surface of the pedestal.

19. The tire monitoring kit of claim 18, wherein the pedestal further includes a guard disposed over at least a portion of the front cavity.

20. The tire monitoring kit of claim 15, wherein the mounting apparatus includes a rubber patch that is configured to bond to an innerliner surface of a tire.

\* \* \* \* \*